United States Patent Office 2,752,504
Patented June 26, 1956

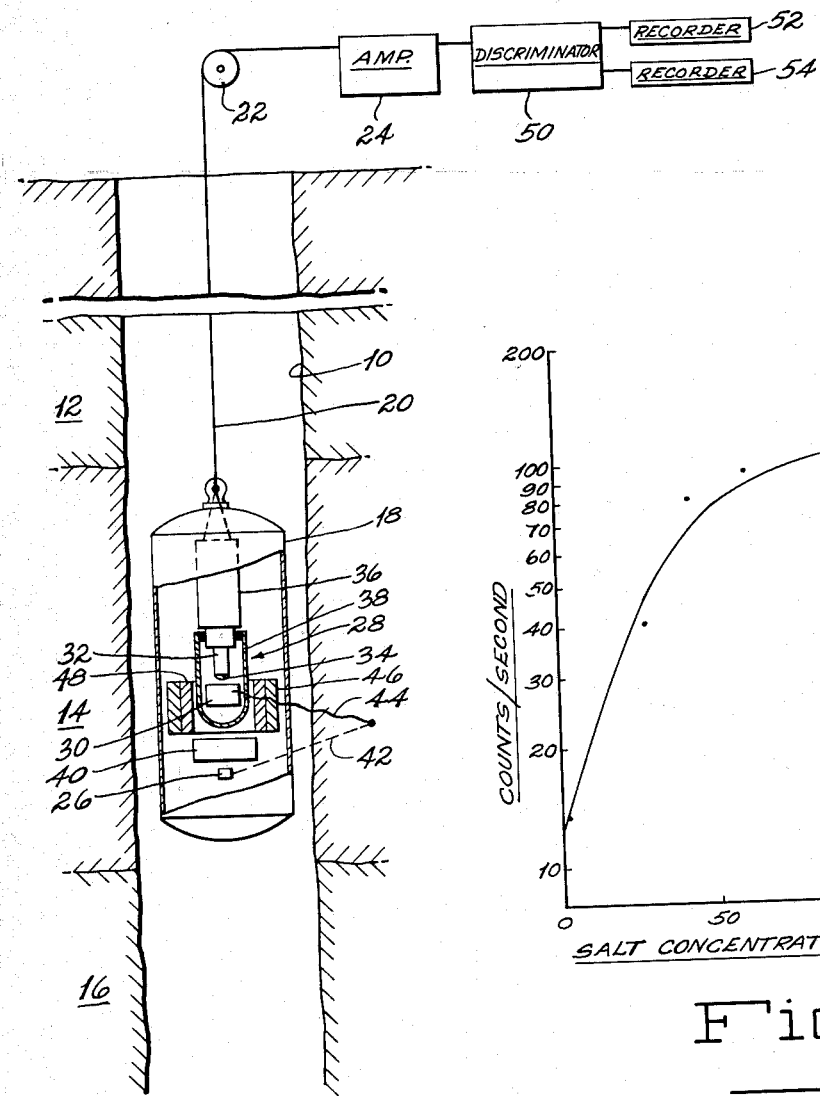

2,752,504

NEUTRON GAMMA-RAY WELL LOGGING

Alexander S. McKay, Bellaire, Tex., assignor to The Texas Company, New York, N. Y., a corporation of Delaware Application February 15, 1952, Serial No. 271,755

2 Claims. (Cl. 250—71)

This invention relates to a method of determining the nature of earth formations, particularly, those formations traversed by a bore hole or well. More specifically, the invention relates to a method of examining earth formations in situ by bombarding the formations with neutrons and measuring the intensity of those gamma rays induced by the neutron bombardment which are indicative of the fact that they are produced by the capture of neutrons by elements other than hydrogen. The principal object of the invention is the provision of a method of this type through the carrying out of which certain elements such, for example, as chlorine can be distinguished from hydrogen. An important application of the method is in the determination as to whether an earth formation contains salt water or hydrocarbon oil.

The fundamental principle involved in this invention is that when formations are bombarded by neutrons, gamma rays having energies of about 2.2 mev. are emitted by hydrogen nuclei on capturing thermal neutrons, while chlorine nuclei, for example, emit gamma rays having energies up to 8 or 9 mev. on capturing thermal neutrons. It has been found that by using a detector of the type of a proportional crystal scintillation counter, it is possible to discriminate against the pulses caused by the 2.2 mev. gamma rays while still counting an appreciable number of the pulses caused by the higher energy gamma rays.

In many formations where oil is found, the nuclei have smaller cross sections for the capture of thermal neutrons than has hydrogen. As a result a large part of the thermal neutrons are captured by the hydrogen nuclei with the emission of 2.2 mev. gamma rays. Sand, which is substantially composed of silicon and oxygen nuclei is an example of such a formation since silicon and especially oxygen have low capture cross sections for thermal neutrons. Chlorine, on the other hand, has a capture cross section which is much larger than those of silicon or oxygen, and therefore if chlorine is present in the formation, some of the thermal neutrons will be captured by chlorine nuclei which then emit gamma rays having energies that are considerably larger than the 2.2 mev. gamma rays which arise through hydrogen thermal neutron capture. In fact, each time a nucleus of the more abundant isotope of chlorine captures a thermal neutron, there is a release of a total energy of about 8 mev. and many other nuclei also emit high energy gamma rays under these circumstances.

When a scintillation counter with a fairly large sensitive mass is used to detect these thermal neutron induced gammas, there is a relation between the maximum size of the pulses that are caused by gammas of a certain energy, and the size of this energy. That is, the maximum pulse size that one obtains from a 2.2 mev. gamma is considerably smaller than the maximum size that is obtained from, for instance, a 4 mev. gamma. Thus, it is seen that if there is a change in the relative numbers of thermal neutrons that are absorbed by the various nuclei of a formation, then in addition to a possible change in the counting rate, this change may make itself apparent in a change in the pulse height distribution which could be detected by a pulse height analyzer.

Experiments have been performed which clearly prove the principles outlined in the foregoing. In one of these experiments a 32 gallon receptacle was filled with water, the salinity of which could be easily varied or controlled. A source of neutrons comprising a mixture of radium and beryllium in a container having lead walls 2" thick was immersed in the water and an additional 4" of lead shielding was placed between the source and a scintillometer having a fairly large luminophor comprising a sodium iodide, thallium activated, crystal in order to minimize the direct radium radiation with the crystal. When the receptacle was filled with pure water, it was found that the hydrogen nuclei first served as the moderator, slowing the fast neutrons down to thermal velocities, and then proceeding to capture most of the thermal neutrons, producing 2.2 mev. photons and deuterium in the process. As chlorine in the form of NaCl was added to the water, the fast neutrons were slowed down as before by the hydrogen nuclei which were present in approximately the same number per unit volume of liquid as before. However, the chlorine nuclei then competed with the hydrogen nuclei for the capture of the thermal neutrons and since the chlorine capture cross section is about 100 times that of the hydrogen, chlorine nuclei capture as many thermal neutrons as the hydrogen when the relative number of chlorine and hydrogen nuclei per unit volume of liquid is only $1/100$ which corresponds to a salinity of 45 grams per litre. This means that when the salinity reaches about 150 grams per liter, the chlorine nuclei are already capturing most of the thermal neutrons and the addition of more chlorine nuclei by increasing the salinity still further will have but little effect on the nature of the neutron capture gamma rays. The fact that the experimental curve of Figure 2 flattens out at the same salinity as the calculated rate of thermal neutron capture by chlorine nuclei versus salinity shows that one can have a quantitative knowledge of the physical processes involved.

In accordance with one embodiment of the invention, the induced gamma rays are detected by a scintillometer comprising, as is well known, a luminophor and a photomultiplier tube and the electrical pulses produced are transmitted to the surface where they are amplified and divided into two groups by means of a conventional discriminator which, for example, can be set to block all pulses smaller than those which correspond to the maximum pulse from a 2.2 mev. gamma ray. The counting rate of the larger pulses is then separately recorded in addition to the usual recording of the counting rate of all pulses which provides the more or less usual neutron-gamma ray log provided, of course, that the detector and the source have satisfactory shielding and geometry. For this to be true, it is assumed that the vertical distance from the source to the detector is about 10 inches. The counting rates for the large pulses will be much smaller than the rates in the other channel. The large pulse rate will increase with increase in the chlorine concentration. In addition, the large pulse counting rate will decrease with increasing hydrogen concentration since the thermal neutrons will be captured farther away from the detector. If a formation consists merely of sand and hydrocarbons, the large pulse counting rate will be low, but if there is salt water present, the large pulse counting rate will increase and thus one can distinguish between oil and salt water.

Certain considerations are of importance in the design of a "chlorine" logging tool or instrument. Since the discriminator bias is set quite high, there is comparatively little interference from the thermal noise of the photomultiplier. It is quite possible that suitable photo-multiplier tubes will be developed for higher temperatures than the type 5819 tube, the present limit of which is about 75° C. When and if this improvement is achieved, there will be less or no necessity for refrigeration of the detector when used in a bore hole. Furthermore, the high discriminator bias also makes the source shielding requirements less stringent than in the case of the present neutron-gamma ray logging instrument. Thus, with the smaller amount of source shielding, the detector may be placed as little as 4 or 5 inches from the source and with this geometry it is known from past experience that the resulting log will be substantially insensitive to the amount of hydrogen in the formations. At the same time, the log will still be sensitive to the presence of chlorine and, thus, by operating with the detector close to the source, changes on the log due to the presence of chlorine can easily be distinguished from changes due to hydrogen content of the formations. If, in this case one wished to measure the hydrogen content simultaneously a second detector at a greater distance from the source would be required together, of course, with means for conducting its output to a recorder at the surface. One also gains in the provision of higher counting rates when the detector is disposed closer to the source.

For a better understanding of the invention, reference may be had to the accompanying drawing in which:

Fig. 1 is a vertical sectional elevation through a portion of a bore hole in which an instrument is disposed for carrying out the method of the invention and, Fig. 2 is an experimental curve showing variation in counting rate with changes in salt concentration.

Referring to the drawing, a bore hole 10 is shown as traversing several sub-surface earth formations such as those indicated at 12, 14 and 16. The bore hole may or may not be provided with a steel casing since it is well known that the neutrons and gamma rays will pass through the conventional casing with but very little loss. Shown within the bore hole is a logging instrument or tool indicated generally by the housing 18. This instrument is suspended from a conductor cable 20 which passes over a suitable cable measuring reel or drum 22 and then to an amplifier 24.

Shown within and preferably in the lower portion of the instrument 18 is a source 26 of neutrons such as a mixture of radium and beryllium. Also within the instrument housing and above the source 26 is a scintillometer indicated generally by the arrow 28 and comprising essentially a luminophor 30 and a photo-multiplier tube 32 which may be of the 5819 type having a cathode 34. The output of the tube 32 passes through a suitable preamplifier 36, the output of which is led to the lower end of the cable 20.

The luminophor 30 and the photo-multiplier tube 32 of the scintillometer are shown as enclosed in a receptacle 38 which may comprise a Dewar flask. If desired, the receptacle 38 may be packed with ice or some other cooling agent at the surface before the instrument is run into the hole so as to maintain the temperature of the tube 32 below 75° C. above which the sensitive surfaces of the photo-multiplier tube would be ruined. It is understood that any other suitable means can be used for refrigerating the scintillometer when it is to be used in a bore hole having temperatures higher than 75° C.

Between the source 26 and the luminophor 30 is a shield member 40, the purpose of which is to absorb a large portion of the direct radiation from the source 26 which otherwise would strike the luminophor and cause spurious indications. As has been stated hereinabove, when the logging instrument is used for making a "chlorine" log, the discriminator bias can be set quite high and the distance between the source 26 and the scintillometer can be as little as 4 or 5 inches. Neutrons such as the one indicated by the dotted line 42 pass outwardly into the surrounding formations wherein gamma rays may be induced, some of these such as the one indicated at 44 passing back into the bore hole to penetrate the luminophor 30. The luminophor scintillates upon gamma ray bombardment with the resulting production of photons, and the nature of the substance is such that the number of photons produced in unit time is a function of the product of the number of impinging gammas and their energies. The photons are converted into electrons by a photo-sensitive device such as the photo-multiplier 32 and each detected gamma ray produces an electron pulse, the amplitude of which is a function of the energy of that gamma ray. It is understood that the luminophor 30 will be of such size that the electrons produced therein dissipate all their energy in the luminophor, which then gives off a certain portion of this energy as photons which are in turn detected by the photo-multiplier tube.

Shown surrounding the luminophor 30 is a short cylinder 46 of a substance such as cadmium capable of absorbing thermal neutrons which might otherwise strike the luminophor. Within the cylindrical shield 46 is another cylindrical shield 48, preferably of lead for absorbing at least a major portion of the gamma rays which might be induced in the cadmium 46 due to the impingement of thermal neutrons thereon. If desired, the two shields 46 and 48 can be replaced by a single cylindrical shield of boron since very little gamma radiation is produced on capture of thermal neutrons in boron and the 4 mev. alpha particles are easily stopped before they reach the luminophor.

It has been found that for the luminophor 30 a crystal of sodium iodide, thallium activated is very satisfactory. Other luminophors which can be used are crystals of thallium activated potassium iodide, calcium tungstate and cadmium tungstate, and as is well-known, these crystals are now available in sufficiently large sizes to operate successfully in a proportional scintillometer.

At the surface, the output from the amplifier 24 passes to a suitable discriminator 50. The discriminator 50 is in effect an adjustable filter which passes only pulses of a predetermined amplitude to the recorder 52 in which the pulses are recorded as traces aginst time. It is also desired that all of the pulses, regardless of their size, be simultaneously recorded in log form and to this end these pulses are led to a second recorder 54. It will be apparent that the log or record obtained at the recorder 54 will comprise more or less what is known as a neutron-gamma ray or induced gamma ray log.

In operation, and assuming that a "chlorine log" is to be made, the instrument 18 will be either lowered or raised past the formations surrounding the bore hole 10. Neutrons from the source 26 cause gamma rays to be induced in the formations and some of these gamma rays strike or penetrate the crystal 30. The photons produced in the crystal strike the cathode 34 of the photo-multiplier tube 32 producing electrical pulses which are pre-amplified at 36 and conducted upwardly over the cable 20 to the surface. These pulses are preferably again amplified at 24 and pass to the discriminator 50, the bias of which is adjusted to a fairly high value, say 60 volts. The smaller pulses, for example, those due to thermal noise in the tube 32 and the pulses produced by the 2.2 mev. gamma rays induced in hydrogen containing formations are blocked out in the discriminator and the pulses of larger amplitude such as those produced by 8 or 9 mev. gamma rays from chlorine are recorded in log form at the device 52. At the same time, a corresponding record is made by the device 54 but in this case all of the pulses, both large and small, are recorded, the discriminator for recorder 54 preferably being set to remove the small pulses caused by thermal noise. Assuming that the instrument 18 is being pulled upwardly past the formations 16 and 14, if the counting rate of the large pulses at 52 is small, an indication will be had to the effect that the formation 16 contains little if any chlorine or salt water. If the counting rate recorded at 54 is fairly low, this would indicate that formation 16 contains hydrogen which in all probability will be in the form of oil. In moving into the formation 14 if the counting rate at 54 remains about the same as before but the counting rate of the large pulses at 52 increases, an indication will be had that the formation 14 contains chlorine or salt water. It is believed obvious that the interface between salt water and oil within a single formation can be determined and located in the same manner.

Figure 2 is a curve which is the result of experiments mentioned hereinabove and shows that as the salt concentration is increased up to from 100 to 150 grams per liter, the counting rate of the large pulses increases very materially.

It may be mentioned that the probability of slow neutron capture is about 100 times as great, atom for atom, in chlorine as in hydrogen. The rate of production of these neutron-capture gamma rays remains essentially constant in a mixture of neutron-capturing atoms. The addition of 1000 chlorine atoms to 100,000 hydrogen atoms causes enough additional absorption that the neutron population is reduced and the net result is that the rate of production of capture gamma rays stays about the same. These 1000 chlorine atoms, however, having 100 times the capturing power produce as many capture gamma rays as the 100,000 hydrogen atoms. Thus, a mixture of one chlorine atom and 100 hydrogen atoms gives off equal numers of chlorine-capture gammas and hydrogen-capture-gamma rays. For these reasons, it is possible to detect quite small brine concentrations by using a neutron-gamma ray scintillation detector proportionally and observing or recording the high energy gamma rays.

While the invention has been described as having particular application to the location of chlorine-containing formations, it is to be understood that considerable other information can be obtained by carrying out this method. Thus, the presence of shales would also be indicated by an increased large pulse counting rate and these readings indicating high porosity on the standard or conventional neutron-gamma ray log could then be dismissed more authoritatively on this basis than by depending on a natural gamma ray log to pick out the shales as has been done in the past. Likewise this method can also be used to locate certain metals, particularly where they occur in a quartz matrix. For example, maganese emits 5.3 or 7.2 mev. gamma rays superimposed on a continuous background on capture of thermal neutrons.

If desired, a differential pulse discriminator can be utilized which accepts only the pulses which lie in a comparatively small amplitude range. This can be very useful when dealing with gamma rays of sufficient energy to largely produce electron pairs on inter-action with the detector. Under these conditions, the pulses will have a definite size corresponding to a certain discrete gamma energy. By using an instrument such as a multi-channel differential pulse discriminator, it is possible that one could differentiate between some of the gammas that are induced in nuclei such as iron, chlorine and silicon.

Although the scintillometer has been described as having a sodium iodide crystal activated with thallium improvements are being made which indicate that the liquid luminophors may also be used successfully in the method described. Likewise, luminophors may be used of the type described in the U. S. Letters Patent No. 2,559,219, granted July 3, 1951, to C. G. Ludeman.

Obviously, many modifications and variations of the invention as hereinbefore set forth may be made without departing from the spirit and scope thereof and, therefore, only such limitations should be imposed as are indicated in the appended claims.

I claim:

1. The method of examining an earth formation traversed by a bore hole to determine whether said formation contains chlorine or oil which comprises bombarding said formation with neutrons from a point within said bore hole to induce gamma rays therein, causing those induced gamma rays reaching a zone in the bore hole spaced vertically from said source by a distance of approximately 4 to 6 inches to impinge upon a body with the resultant transfer of gamma ray energy to electrons which in turn produce photons while causing substantially all of the energy of the electrons to be dissipated in said body, causing said photons by electron cascade to produce electrical pulses proportional in amplitude to the energy of the activating gamma rays, and recording those pulses having high amplitudes of the order of 8 mev., the presence of any substantial number of these pulses being indicative of the presence of chlorine in said formation.

2. The method of examining an earth formation traversed by a bore hole to determine whether said formation contains a substance having a cross section for capture of thermal neutrons which is appreciably higher than the cross section of a hydrogen-containing substance which comprises bombarding said formation with neutrons from a point within the hole to induce gamma rays therein, causing those induced gamma rays reaching a zone in the bore hole spaced vertically from said source by a distance of approximately 4 to 6 inches to impinge upon a body with the resultant transfer of gamma ray energy to one or more electrons which in turn produce photons while causing substantially all of the energy of the electrons to be dissipated in said body, causing said photons by electron cascade to produce electrical pulses proportional in amplitude to the energy of the activating gamma rays, and recording those pulses having high amplitudes of the order of 8 mev.

References Cited in the file of this patent

UNITED STATES PATENTS

| | | |
|---|---|---|
| 2,469,460 | Fearon | May 10, 1949 |
| 2,508,772 | Pontecorvo | May 23, 1950 |
| 2,648,012 | Scherbotskoy | Aug. 4, 1953 |

OTHER REFERENCES

"The Detection of Gamma-Rays with Thallium-Activated Sodium Iodide Crystals," Hofstadter, Physical Review, vol. 75, No. 5 Mar. 1949, pgs. 796–798.